United States Patent
Mori et al.

(10) Patent No.: US 9,499,892 B2
(45) Date of Patent: Nov. 22, 2016

(54) SLIDING MEMBER AND PRODUCTION METHOD FOR SAME

(71) Applicant: KABUSHIKI KAISHA TOYOTA CHUO KENKYUSHO, Nagakute-shi, Aichi-ken (JP)

(72) Inventors: Hiroyuki Mori, Nisshin (JP); Hiroyuki Ishikawa, Iwakura (JP); Shintaro Igarashi, Toyota (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 30 days.

(21) Appl. No.: 13/894,960

(22) Filed: May 15, 2013

(65) Prior Publication Data

US 2013/0316188 A1 Nov. 28, 2013

(30) Foreign Application Priority Data

May 25, 2012 (JP) ................. 2012-119595

(51) Int. Cl.
| | | |
|---|---|---|
| *B21D 39/00* | (2006.01) | |
| *C22F 1/00* | (2006.01) | |
| *B23K 26/00* | (2014.01) | |
| *B23K 26/36* | (2014.01) | |

(52) U.S. Cl.
CPC ............. *C22F 1/00* (2013.01); *B23K 26/0006* (2013.01); *B23K 26/0078* (2013.01); *B23K 26/0084* (2013.01); *B23K 26/0087* (2013.01); *B23K 26/362* (2013.01); *B23K 2203/08* (2013.01); *B23K 2203/50* (2015.10); *Y10T 428/12458* (2015.01)

(58) Field of Classification Search
None
See application file for complete search history.

(56) References Cited

U.S. PATENT DOCUMENTS

| | | | | |
|---|---|---|---|---|
| 2,268,869 A | * | 1/1942 | Given ......................... | 384/283 |
| 2,431,430 A | * | 11/1947 | Shaw ........................... | 384/285 |
| 4,474,861 A | * | 10/1984 | Ecer ..................... | B22F 3/1055 |
| | | | | 219/121.65 |
| 7,704,337 B2 | * | 4/2010 | Kanemitsu et al. .......... | 148/565 |

FOREIGN PATENT DOCUMENTS

| | | |
|---|---|---|
| JP | A-62-133016 | 6/1987 |
| JP | A-1-306526 | 12/1989 |
| JP | A-10-72656 | 3/1998 |
| JP | A-2005-002801 | 1/2005 |
| JP | A-2008-45573 | 2/2008 |
| JP | A-2011-062718 | 3/2011 |

(Continued)

OTHER PUBLICATIONS

Office Action issued in Japanese Patent Application No. 2012-119595 mailed Apr. 15, 2014 (with translation).

(Continued)

*Primary Examiner* — Daniel J Schleis
(74) *Attorney, Agent, or Firm* — Oliff PLC

(57) ABSTRACT

A sliding member has a sliding surface of a different form than a conventional sliding surface, and exhibits stable sliding characteristics even under a high surface pressure. The sliding member has a sliding surface formed on a surface of a metal base material, and includes two surface textures: a hard part and a tough part. The tough part contacts with the hard part and has a hardness lower than that of the hard part. The sliding surface includes the surface texture, in which the hard part and the tough part that supports the hard part are present in a mixed fashion with a micro-meso region level, and stably exhibits excellent wear resistance.

11 Claims, 8 Drawing Sheets

SLIDING CROSS-SECTION

(56) References Cited

FOREIGN PATENT DOCUMENTS

WO    WO 97/36018 A1    10/1997
WO    WO 02/08623 A1    1/2002

OTHER PUBLICATIONS

Menthe et al., "Further Investigation of the Structure and Properties of Austenitic Stainless Steel After Plasma Nitriding," *Surface and Coatings Technology*, 1999, vol. 116-119, pp. 199-204.
Nolan et al., "Sliding Wear of Titanium Nitride Thin Films Deposited on Ti-6A1-4V Alloy by PVD and Plasma Nitriding Processes," *Surface & Coatings Technology*, 2006, vol. 200, pp. 5698-5705.
Fujii et al., "Application of Titanium and Its Alloys for Automobile Parts," *Shinnippou Giho*, 2003, vol. 378, pp. 62-67 (with English Abstract).
Jan. 6, 2015 Notification of Reasons for Refusal issued in Japanese Patent Application No. 2012-119595.
Dec. 15, 2014 Notification of Reasons for Refusal issued in Japanese Patent Application No. 2012-119595 (with translation).
Aug. 4, 2015 Notification of Decision for Rejection issued in Japanese Patent Application No. 2012-119595.
Aug. 4, 2015 Notification of Decision for Dismissing an Amendment issued in Japanese Patent Application No. 2012-119595.

\* cited by examiner

SLIDING DIRECTION ←

HARD PART
TOUGH PART
SLIDING SURFACE

SLIDING DIRECTION ←

HARD PART
TOUGH PART
SLIDING SURFACE

HARD PART
TOUGH PART
SLIDING CROSS-SECTION

GRID-LIKE

DOT-LIKE

COMPLEX PATTERN I

COMPLEX PATTERN II

COMPLEX PATTERN III

STEEL BASE MATERIAL (NITROGEN GAS)

TITANIUM BASE MATERIAL (NITROGEN GAS)

SLIDING MEMBER AND PRODUCTION METHOD FOR SAME

TECHNICAL FIELD

The present invention relates to a sliding member that comprises a sliding surface having a surface texture, and to a production method for the same.

BACKGROUND ART

A sliding member is obtained by subjecting a base material surface to be a sliding surface to various surface modification treatments to enhance the wear resistance and other properties and ensure a stable sliding characteristic. Typical examples of surface modification treatments include nitriding treatment, carburizing treatment, and formation of amorphous carbon film (DLC film). A number of approaches to such surface modification treatments have been proposed, and relevant descriptions are disclosed such as in literature below.

CITATION LIST

Patent Literature

[PTL 1]
Japanese Unexamined Patent Application Publication No. 10-72656
[PTL 2]
WO02/008623
[PTL 3]
WO97/036018

Non Patent Literature

[NPL 1]
E. Menthe, Surf. Coat. Technol. 116-119, (1999), 199-204
[NPL 2]
D. Nolan, Surf. Coat. Technol. 200, (2006), 5698-5705
[NPL 3]
Hideki FUJII et al., Nippon Steel Technical Report 378, (2003), 62-67, "Application of Titanium and Its Alloys for Automobile Parts"

SUMMARY OF INVENTION

Technical Problem

Conventional surface modification treatments were all for modifying the whole of a base material surface by diffusing N, O, or the like from the base material surface to the inner part of the base material. The obtained conventional modified layer in such a manner was a concentration gradient layer in which the concentration of N, O, or the like varies sharply from the surface toward the inner part, and the outermost part of the modified layer was thus extremely hard and brittle in accordance with the concentration variation. If such a modified layer provides a sliding surface and the sliding surface is applied thereto with an impacting load or used under a high surface pressure, then fatigue wear may possibly occur, such as flaking, spalling, and pitting.

The present invention has been created in view of such circumstances, and objects of the present invention include providing a sliding member which has a novel sliding surface with an entirely different form than those of conventional ones and which stably exhibits excellent sliding characteristics even under a high surface pressure, and also providing a production method for the same.

Solution to Problem

As a result of intensive studies to solve such problems and repeating trial and error, the present inventors have found out that a sliding surface formed by partially irradiating near-ultraviolet nanosecond pulse laser to a surface of a metal base material stably exhibits an excellent wear resistance even under a high surface pressure. Developing this achievement, the present invention has been accomplished as will be described hereinafter.

«Sliding Member»

(1) The sliding member according to the present invention is a sliding member that has a sliding surface formed on a surface of a metal base material, and is characterized in that the sliding surface comprises a surface texture comprising: a hard part; and a tough part contacting with the hard part and having a hardness lower than that of the hard part.

(2) The sliding member according to the present invention has a sliding surface configured of a surface texture in which a hard part and a tough part that have different hardness of the surfaces thereof are present in a mixed fashion, and stably exhibits excellent sliding characteristics that scuffing and the like are unlikely to occur such as due to wear, seizure and poor toughness even under high surface pressure.

The form of the surface texture according to the present invention can be freely adjusted such as by changing the shape, dimensions, location and other factors of the hard part and the tough part. Therefore, a sliding member can be easily obtained which comprises an optimum sliding surface having suitable hardness, toughness and other properties for usage environment. In such respect, the sliding member according to the present invention is entirely different from a conventional sliding member provided with uniform sliding surface on the whole surface.

Although the reason is not necessarily sure that the sliding member according to the present invention stably exhibits excellent sliding characteristics, it may be considered under present circumstances as below. The sliding surface according to the present invention is in a form (surface texture) which is formed of the hard part that contributes to the improvement in wear resistance and the tough part that contacts thereto. Such a sliding surface is in a state where the hardness and the toughness, which are in a kind of trade-off relationship, are concurrently satisfied with high dimensionality, and is thus entirely different from a conventional sliding surface in which the whole surface is formed of a hard layer having low toughness. In such a way, it can be considered that the sliding member according to the present invention is unlikely to cause breaking and cracking as well as fatigue wear (such as flaking, spalling, and pitting) even if being used under a high surface pressure, and stably exhibits for a long time excellent sliding characteristics (such as wear resistance) even if being used under a high load (high surface pressure).

«Production Method for Sliding Member»

(1) The above sliding member can be obtained, for example, through the production method according to the present invention, characterized by comprising an irradiation step that irradiates a high energy beam to a surface part to be treated of a metal base material while relatively moving the high energy beam thereby to cause ablation in the surface part and to generate plasma in the vicinity of the surface part, wherein the above sliding member is obtained to have the surface part as the hard part.

(2) Although the reason is not necessarily sure that this production method allows to form a sliding surface which exhibits excellent sliding characteristics, it may be considered under present circumstances as below. When the high energy beam is appropriately irradiated to the surface part to be treated of the metal base material, ablation can be caused in the surface part of the metal base material. This ablation allows atoms and the like that constitute the metal base material in the surface part to be released such as by gasification, evaporation, transpiration, and scattering. Particles released in such a manner (referred accordingly to as "released particles") can take various forms, such as atoms, molecules, ions, electrons, photons, radicals, and clusters. Such released particles activate ambient gases (such as nitrogen, oxygen, and air) in the vicinity of the surface part under treatment. Further, a reaction field comprised of a mixed state of the released particles and the activated atoms in the ambient gases (referred appropriately to as "plasma") can be generated within or in the vicinity of the surface part under treatment in which the ablation is caused (referred accordingly to as "ablation part").

Irradiated region by the high energy beam moves on the surface part to be treated of the metal base material thereby in turn to cause the above phenomenon in a substantially continuous manner, and the surface part under treatment and the vicinity thereof become a state where a considerable number of the released particles and the plasma are present to generate the reaction field. These released particles and plasma then re-fill and are enclosed in the part in which the ablation is caused, and a homogeneous and relatively deep modified part (hard part) is formed which comprises at least fine crystal grains.

During this process, depending on the types of the metal base material and the ambient gases, compounds (such as nitrides and oxides) and/or solid solutions may be generated in the modified part due to the reaction between the released particles and the plasma, and/or phase transformation may occur.

When the hard part is formed using the ablation as in the production method according to the present invention, the periphery thereof is unlikely to be affected by the thermal influence. Consequently, the periphery of the hard part is formed by itself with a tough part which has original characteristics of the metal base material because of not being affected by the thermal influence.

Moreover, according to the present invention, the hard part and therefore the surface texture are formed using the high energy beam thereby to allow extremely large degrees of freedom in the forms thereof, and surface textures can thus be formed in various forms suitable for the specifications of sliding members. In addition, the production method according to the present invention may not have to perform a long time treatment under a high temperature environment like the conventional heat treatment, and the degree of freedom in selecting a metal base material is extremely large, so that optimum sliding surfaces can efficiently be formed for various metal base materials.

(3) The "high energy beam" referred to in the present invention is a light ray or an electron ray which is a beam having both a sufficient energy for the metal base material to be ablated and a strong electric field for causing the irradiated part and the vicinity thereof to be plasma, and specific examples include laser and electron beam.

The atmosphere for the irradiation step may be such that plasma can be generated by the ablation. Specific examples thereof include nitrogen gas atmosphere, oxygen gas atmosphere, and mixed gases atmosphere including nitrogen gas and/or oxygen (e.g. diluted atmosphere by inert gas, and air atmosphere). The pressure and the temperature in the atmosphere may be appropriately adjusted, but the production method according to the present invention allows for the hard part to be formed in an atmosphere of ordinary temperature and atmospheric pressure.

«Others»

(1) Each hardness of the hard part and the tough part according to the present invention was evaluated using an average (surface) hardness obtained by calculating five-point average on the bases of micro-Vickers hardness values measured from the surface to the inner part of 15 micrometers in the cross-section. When the hardness from the sliding surface is measured, the hard part is formed in a part irradiated with the high energy beam. The formed part can be recognized by change in color of the radiated part or appearance observation regarding the shape. Otherwise, the hard part as the irradiated part and the tough part can be easily determined by metallographic observation because their metallographic structures are different. Moreover, detection of nitrogen or oxygen based on Electron Probe Micro-Analysis (EPMA) can be used. Other surface elemental analysis approaches may also be used for detection, such as Auger Electron Spectroscopy analysis (AES analysis) and X-ray Photoelectron Spectroscopy analysis (XPS analysis).

(2) It is preferred that the sliding surface according to the present invention comprises a surface texture configured of one or more hard parts, which are formed in terms of fine regions, and one or more tough parts, which are formed around the one or more hard parts. In the present description, such a surface texture is referred to as a surface texture in which the one or more hard parts and the one or more tough parts are present in a mixed fashion with micro-meso region level. The term "micro-meso region level" as used herein is defined as an intermediate region between macro ones and micro ones. In general, processing according to a conventional semiconductor process is centered on nano-processing around or below sub-micron. On the other hand, mechanical processing is centered on macro-processing around or above 1 mm. The micro-meso region as defined herein refers to a size larger than 1 micrometer and smaller than 1 mm. In this region, the surface texture comprising the modified hard part and the tough part can be formed to thereby ensure the wear resistance in the sliding part.

On this occasion, each size can be specified or identified by observing and detecting the hard parts as the laser irradiated parts using an optical microscope, laser microscope, noncontact white light interferometric surface-shape measurement, etc. When an optical microscope is used, the identification is possible by the change in color of the irradiated parts. When a laser microscope or noncontact white light interferometric surface-shape measurement is used, the identification is possible by the change in the surface form. This allows the sizes of the hard parts and the tough parts to be specified. If the above method is difficult to be accomplished, then Electron Probe Micro-Analysis (EPMA) may be used to detect nitrogen or oxygen for this use. It should be emphasized that the surface texture of the micro-meso region represents that the dimensions of the hard parts and the tough parts are larger than 1 micrometer and smaller than 1 mm. Note, however, that the micro-meso region refers to the size of the formed surface texture and may not necessarily represent the dimensions of the whole of the sliding member formed thereon with the surface texture. Forming them on the whole of the sliding surface also allows a desired function to be developed.

(3) Unless otherwise stated, a numerical range "x to y" as used herein includes the lower limit value x and the upper limit value y. Various numerical values or any numerical value included in various numerical ranges described herein may be used as a new lower limit value or upper limit value, and any numerical range such as "a to b" may be newly provided.

DESCRIPTION OF EMBODIMENTS

Figure 1A:
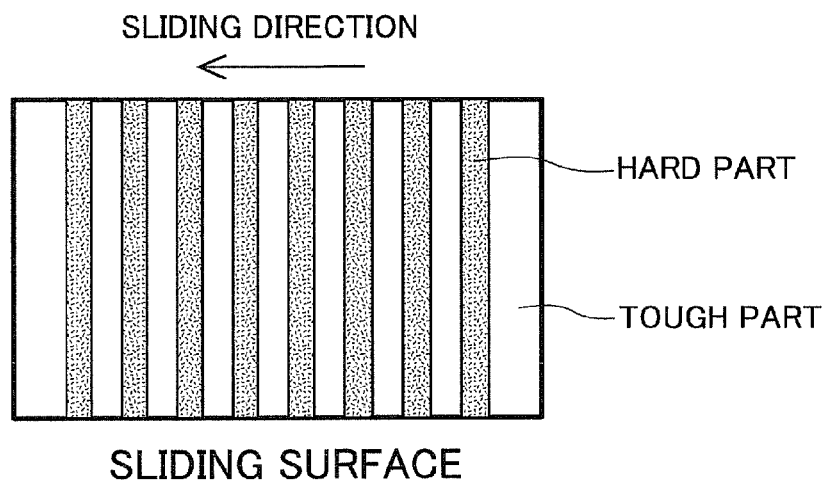
FIG. 1A is a schematic view illustrating a stripe-like surface texture which has hard parts extending in a direction perpendicular to the sliding direction.

The contents described herein may be applied not only to the sliding member according to the present invention but also to the production method for the same. One or more features freely selected from the description herein may be added to the above-described features of the present invention. In this respect, features regarding the production process, when understood as a product-by-process, may also be features regarding a product. Note that whether or not which embodiment is the best is different in accordance with objectives, required properties and other factors.

«Sliding Member»

(1) Metal Base Material

The metal base material according to the present invention may be pure metal or alloy if capable of being hardened and suitable for a sliding member, and the type and the component composition thereof are not limited. The metal base material may be, such as, but not limited to, iron alloy, titanium alloy, aluminum alloy, magnesium alloy, or copper alloy. Iron alloy may be commonly-used carbon steel or special steel containing various alloy elements (such as stainless steel and nitride steel). Titanium alloy may be alpha-type titanium alloy, beta-type titanium alloy, or alpha-beta-type titanium alloy.

Note that, according to the production method of the present invention, a sliding surface comprising a desired surface texture can be formed without being exposed to high temperature environment. Therefore, the present invention also covers a metal base material which was unsuitable for high temperature treatment and a metal base material which cannot be hardened such as by high temperature treatment. In any event, it is preferred that appropriate hardening treatment is performed depending on the type of metal base material. For example, hardening by nitridation treatment or oxidation treatment may be effective for iron alloys, titanium alloys, aluminum alloys, etc, while hardening by oxidation treatment may be effective for magnesium alloys, copper alloys, etc.

(2) Hard Part and Tough Part

The hard part according to the present invention may be one which is hardened by generation of compounds and/or solid solutions, one which is hardened by phase transformation, or one which is hardened by structural size refinement. Such a hard part can be provided in general as a modified part obtained by locally performing modification treatment for the surface of a metal base material. More specifically, the modified part may be, such as, but not limited to, a nitride part subjected to nitridation treatment, an oxide part subjected to oxidation treatment, a phase transformation part (especially quenched part) subjected to heat treatment, a size refined part subjected to size refinement treatment for crystal grains, etc.

In contrast, the tough part may be obtained in general as an unmodified part without being subjected to such a modification treatment. The unmodified part can be considered basically as comprising the metal base material before the hardening treatment, but may have different structure and/or characteristics from those before the treatment so long as having lower hardness than that of the hard part.

While specific hardnesses of the hard part and the tough part are not limited in the present invention, it is preferred that the hardness of the hard part is 1.2 times or more, 1.5 times or more, 2 times or more, or 3 times or more that of the tough part. Note that these hardnesses may be evaluated on the basis of micro-Vickers hardness.

In the case where the hard part is obtained by hardening due to compounds of nitrogen (N), oxygen (O), etc. (such as nitride and oxide), it is preferred that the concentration of N, O, etc. is 0.5 atomic percent (at %) or more, 1.5 at % or more, or 3 at % or more. Measurement of their concentrations may be performed by analyzing the hard part as the modified part having the surface texture of micro-meso region level using EPMA, AES, and/or XPS. The dimensions of the hard part may range from around or above micrometer to below 1 mm, so, in the case of minimum, resolution power of micrometer region may be necessary. If only the hard part is analyzed, EPMA and AES analysis are suitable because local analysis in micrometer region is possible. Possible measurement method may be a method of measuring from the sliding surface, or measuring by performing cross-section analysis after making the hard part expose the cross-section. In the latter case, the situation of the hard part in the cross-sectional depth direction can be perceived in addition to that of the surface. The analyzed N or O in the hard part of the sliding surface when EPMA analysis is performed represents an analysis of a region from the surface to about several micrometers depth. In addition to the above, if information regarding the inner part from the surface is required considering the life of the sliding part, it may be necessary to perceive the situation of the hard part in the depth direction by making the hard part expose the cross-section. In this case, cross-sectional EPMA analysis may be performed for element concentration measurement at some depths, such as 15, 30, and 45 micrometers.

Note that, according to the production method of the present invention, N and/or O can be brought into the metal base material without relying on the surface diffusion like in the conventional method, so that considerable amount of N, O, etc. can be brought even into a deep location of the hard part. Therefore, any upper limit of the concentration of N, O, etc. may be possible so long as being lower than the theoretical upper limit value defined in itself due to the composition, crystal structure, and other factors of the metal base material.

According to the production method of the present invention, apparently different from a conventional solidified structure obtained after being molten (semi-molten) using $CO_2$ laser, the hard part can be obtained which comprises extremely fine crystal structure. More specifically, average crystal grain diameter of the hard part according to the present invention may be 10 micrometers or less, 5 micrometers or less, 1 micrometer or less, or 400 nm or less. While the lower limit value of the average crystal grain diameter is not limited, it may be 1 nm or more or 20 nm or more with consideration for the production cost, quality stability, and other factors.

The "average crystal grain diameter" as used herein is specified as follows. First, after observing a cross-section of the structure and assuming that the cross-sectional shape of the observed grain is an ellipse, the average of its long axis and short axis is to be the crystal grain diameter of one crystal grain. Then, the simple average (arithmetic average) of crystal grain diameters calculated for five points randomly extracted from the cross-section of the structure being observed is to be the average grain diameter as used herein.
(3) Form of Surface Texture The form of the surface texture is not limited so long as the surface texture comprises one or more hard parts and one or more tough parts. For example, by adjusting the trace of the irradiated region by the high energy beam, various forms of the surface texture can easily be obtained.

Figure 1B:
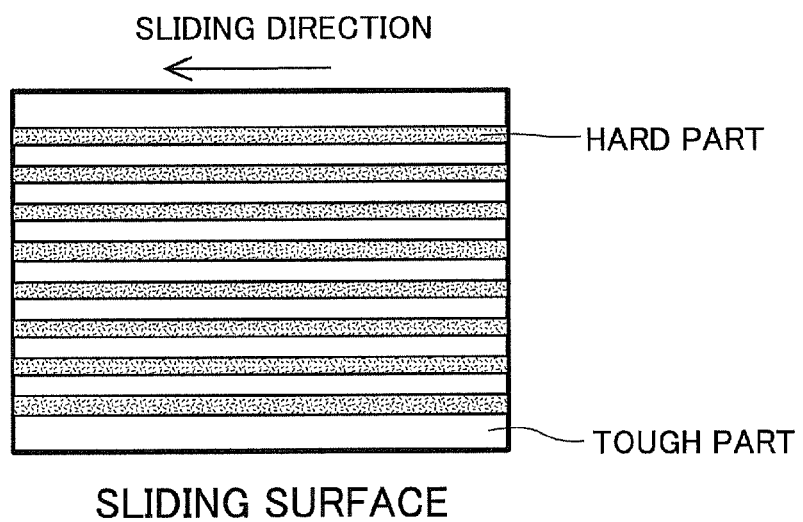
FIG. 1B is a schematic view illustrating a stripe-like surface texture which has hard parts extending in a direction parallel to the sliding direction.
Figure 1C:
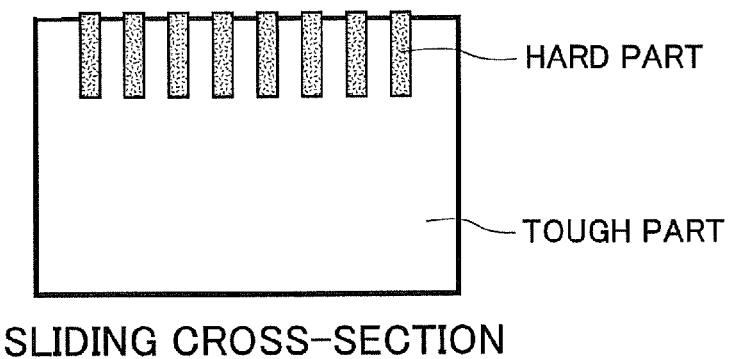
FIG. 1C is a schematic view illustrating a cross-section of a stripe-like surface texture.
Figure 2A:
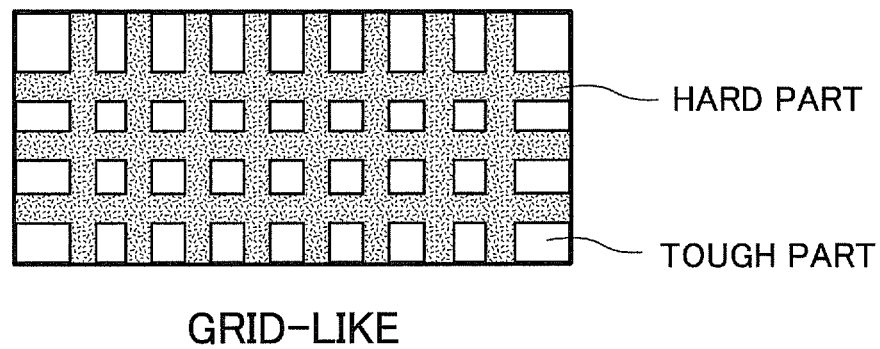
FIG. 2A is a schematic view illustrating a grid-like surface texture.
Figure 2B:
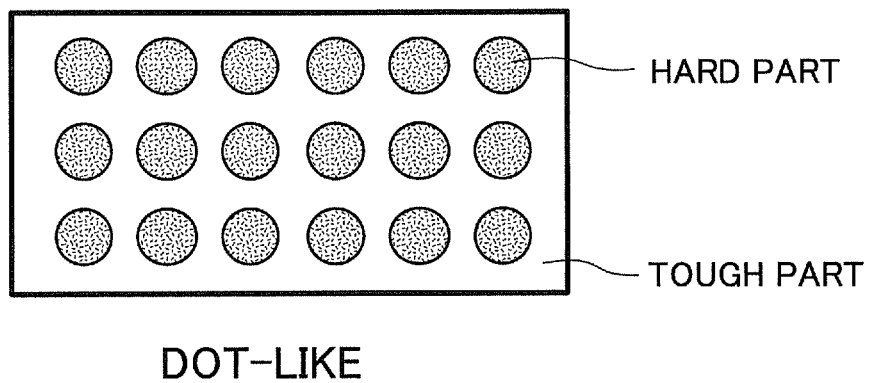
FIG. 2B is a schematic view illustrating a dot-like surface texture.
Figure 3A:
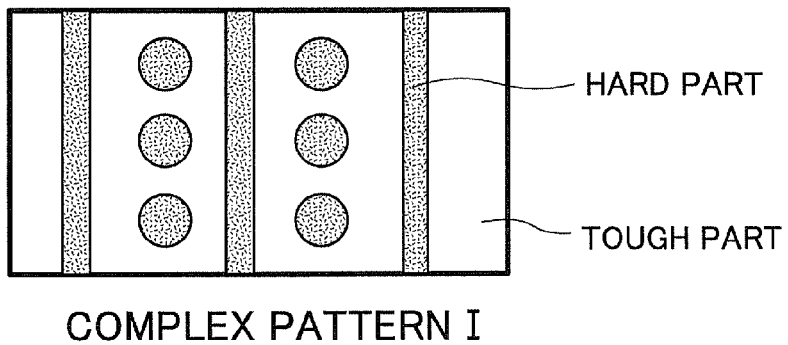
FIG. 3A is a schematic view illustrating a surface texture comprising a complex pattern I in which stripe-like hard parts and dot-like hard parts are combined.
Figure 3B:
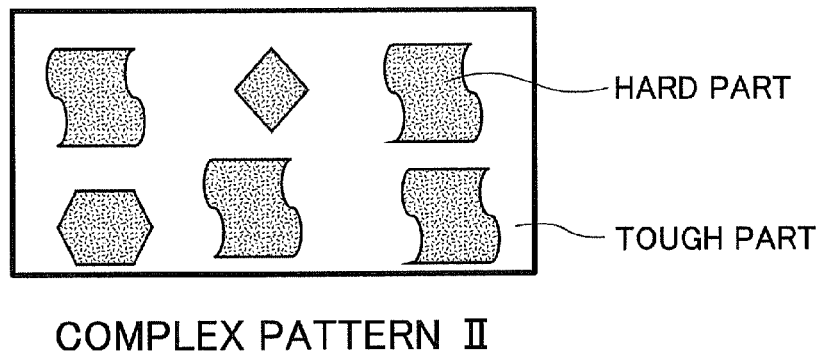
FIG. 3B is a schematic view illustrating a surface texture comprising a complex pattern II in which various shapes of hard parts are combined.
Figure 3C:
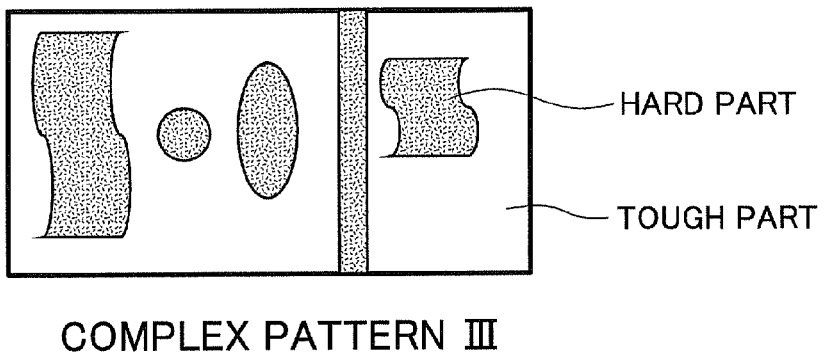
FIG. 3C is a schematic view illustrating a surface texture comprising a complex pattern III in which various shapes of hard parts are combined.

More specifically, the surface texture may be such that at least a part or parts of the hard part or hard parts are stripe-like (refer to FIG. 1A to FIG. 1C), grid-like (refer to FIG. 2A), or dot-like (refer to FIG. 2B). Furthermore, the surface texture may also be, in addition to the above or alternatively, a complex pattern in which stripe-like hard parts and dot-like hard parts are combined (FIG. 3A), a complex pattern in which hard parts of freely selected shapes are regularly or irregularly combined (FIG. 3B, FIG. 3C), etc.

Moreover, using high energy beam like in the production method according to the present invention allows not only the pattern of the surface texture but also the dimensions, the depth and other parameters of the hard parts to be freely adjusted. For example, it is possible that the width and the diameter of the hard parts may be 10 micrometers or less, 1 micrometer or less, or 0.5 micrometers or less, and the depth thereof may be 50 micrometers or more or 100 micrometers or more.

The surface texture is preferably such that the surface area ratio (100×S1/S0) as a fraction of the total surface area (S1) of the hard parts to the entire surface area (S0) is 2% to 95%, 10% to 70%, or 30% to 50%. If the surface area ratio is unduly low, then the amount of the hard parts decreases, while on the other hand, if the surface area ratio is unduly high, then the amount of the tough parts decreases, thus both cases may deteriorate the sliding characteristics. Note that the entire surface area (S0) of the surface texture is the sum of the total surface area (S1) of the hard parts and the total surface area (S2) of the tough parts (S0=S1+S2). In addition, each surface area can be specified or identified by observing and detecting the hard parts as the laser irradiated parts using an optical microscope, laser microscope, noncontact white light interferometric surface-shape measurement, etc. When an optical microscope is used, the identification is possible by the change in color of the irradiated parts. Binarizing these images enables the surface area ratio of the hard parts to be obtained. When a laser microscope or noncontact white light interferometric surface-shape measurement is used, the identification is possible by the change in the surface form. These can also be obtained by binarizing parts of the irradiated parts in which the surface form and the roughness change. In addition, nitrogen and/or oxygen may be directly detected using EPMA analysis, and parts where a predetermined amount of nitrogen and/or oxygen is detected may be determined as being the hard parts. This allows the surface area ratio of the hard parts and the tough parts to be calculated.

Moreover, if at least a part or parts of the hard part or hard parts that constitute the surface texture are located to extend non-parallelly to the sliding direction, then the sliding characteristics may further be improved. Although the reason of this is not necessarily sure, it appears that if all of the hard parts are located to extend parallelly to the sliding direction, then this direction coincides with a direction along which lubrication oil agent flows out, whereas if the hard parts are present to extend non-parallelly to the sliding direction, then fine oil sumps may be formed between a counterpart sliding body and the hard parts or the tough parts.

The surface texture may be flat surface-like or various types of curved surface-like depending on the surface of the metal base material (sliding surface). Moreover, the surface texture may be two-dimensional form or otherwise be three-dimensional form (e.g. fine recess-like or dimple-like). According to the production method of the present invention, any surface texture can easily be formed by adjusting the output density, beam diameter, focal point and other parameters of the high energy beam.
« Production Method for Sliding Member»
(1) High Energy Beam The type of the high energy beam is not limited so long as it causes ablation in the surface part under treatment of the metal base material and plasma is generated from ambient gas surrounding the ablation part. The high energy beam may be, such as, but not limited to, pulse laser or electron beam, for example.

In order to cause ablation, high energy needs be given at once to the surface part to be treated of the metal base material. That is, high energy beam having a high energy density (fluence) that exceeds a threshold for ablation needs be given to the surface part to be treated of the metal base material. High-output pulse laser of short pulse width is preferable as such high energy beam.

If parameters such as output power and oscillation frequency of a laser oscillation apparatus are constant, then shorter pulse width provides higher fluence laser light to be irradiated to the surface part under treatment. In addition, as the pulse width becomes short, heat diffusion to the outside the irradiated region is suppressed, so that ablation may be facilitated and the thermal influence to the metal base material can also be suppressed. More specifically, it is preferred that the pulse width of pulse laser is 10 ps to 100 ns or 1 to 50 ns, for example. If the pulse width is unduly large, then fluence required for ablation is difficult to be obtained, whereas if the pulse width is unduly small (about 150 fs where multiple photon absorption occurs, for example), then the energy imparting form by laser light changes, and any required reaction field for the hardening according to the present invention may not be formed.

It is preferred that the output density of pulse laser (referred appropriately to as "laser fluence" or simply to as "fluence") is 0.3 MW/cm$^2$ to 100 TW/cm$^2$, 1 MW/cm$^2$ to 30 GW/cm$^2$, or 3 MW/cm$^2$ to 3 GW/cm$^2$. The fluence affects the hard part depth (thickness), so that if the fluence is unduly small, then the hard part is difficult to have a sufficient thickness, whereas if the fluence is unduly large, then the thermal influence to the metal base material becomes serious. Note that the fluence is obtained by dividing the laser output by the laser spot area.

Moreover, as the wavelength of pulse laser becomes short, the absorptance of the metal base material for laser light is enhanced thereby to result in advantages such as that the ablation may be facilitated and the non-ablation part (tough part) can be suppressed from being transformed. Furthermore, appropriately adjusting the wavelength of pulse laser may facilitate the formation of the hard part having a sufficient depth. It is preferred that such wavelength of pulse laser is shorter than the infrared region or within the ultraviolet region (including near-ultraviolet region) which is shorter than the visible region. More specifically, the wavelength of pulse laser is preferably 700 nm or less, 550 nm or less, or 380 nm or less. In addition, the wavelength of pulse laser is preferably 190 nm or more, or 320 nm or more. If the wavelength of pulse laser is unduly short, then absorption of laser due to ambient gases occurs, thus being undesirable.

Specific examples of such pulse laser include excimer laser that utilizes excimer (excited dimer), such as $F_2$ (wavelength 157 nm), ArF (wavelength 193 nm), KrF (wavelength 248 nm), XeCl (wavelength 308 nm) and XeF (wavelength 351 nm), and YAG laser that can oscillate at short wavelength.

(2) Irradiation Step

The irradiation step is a step which irradiates high energy beam to the surface part of the metal base material in accordance with the form of a desired surface texture and therefore the form of the hard part while causing the irradiated region to move.

In the case where pulse laser is used as the high energy beam, if irradiated regions by pulse light beams adjacently oscillating are partially overlapped, then a continuous hard part is likely to be stably formed. The ratio for overlapping the irradiation regions of pulse waves (pulse lap ratio) may be adjusted such as by the oscillation frequency of pulse laser, the relative movement speed to the surface part under treatment (referred appropriately to as "scanning speed"), and the dimensions of the radiation regions at the outermost surface of the surface part under treatment (or focal position of pulse laser). Although the pulse lap ratio is difficult to be uniformly specified because of being different depending on the characteristics of pulse laser, it is preferably 10% to 99.9%, 20% to 95%, or 50% to 90%. If the pulse lap ratio is unduly small, then the formation of the hard part becomes difficult and removing process may merely be achieved. If, on the other hand, the pulse lap ratio is unduly large, then the formation efficiency of the surface texture may be deteriorated and homogenization of the texture structure may be difficult.

This pulse lap ratio is calculated by $(r/d) \times 100(\%)$ (d: beam diameter, r: overlapped diameter of adjacent pulse waves). The beam diameter (d) herein is a width (diameter) when the beam intensity measured on the orthogonal plane to the laser axis is $1/e^2$ level of the peak intensity value. In addition, the overlapped diameter (r) of adjacent pulse waves is d−R (R: center-to-center distance between adjacent beams).

The pulse lap ratio may be used as the basis to adjust the oscillation frequency, scanning speed, focal position, and other appropriate parameters, and one example thereof is as follows. The oscillation frequency is preferred to be 1 to 100 kHz or 10 to 50 kHz, for example. If the oscillation frequency is unduly low, then the scanning speed may accordingly have to be reduced, and the efficient formation of the surface texture becomes difficult. If on the other hand, the oscillation frequency is unduly high, then the laser fluence is deteriorated in general, and the homogeneous formation of the hard part becomes difficult.

The scanning speed is preferred to be 0.1 to 100 mm/s or 1 to 10 mm/s, for example. If the scanning speed is unduly low, then the efficient formation of the surface texture becomes difficult, whereas if the scanning speed is unduly high, then the homogeneous formation of the hard part becomes difficult like in the case where the corresponding oscillation frequency is unduly high.

Depending on the focal position of pulse laser, the irradiation range of each pulse beam varies. The focal position may be located at the outermost surface of the surface part under treatment of the metal base material or at a position shifted from the outermost surface. Note, however, that as the focal position departs from the irradiated part of pulse laser (the outermost surface part of the surface part under treatment), the fluence at the irradiated part is deteriorated and the hard part having a sufficient thickness becomes difficult to be stably formed. This tendency is significant particularly in the case where a fine spot diameter is obtained at the irradiated part by concentrating the laser.

(3) Atmosphere

As previously described, the atmosphere in which the irradiation step is performed may be such that ablation can cause plasma when the high energy beam is irradiated. Such an atmosphere may be appropriately selected depending on the composition of the metal base material, the specification of the hard part, the type of the high energy beam, and other factors, and may comprise nitrogen, oxygen, inert gas, mixed gas of two or more kinds thereof (including air), and others, for example.

The irradiation step may be performed in a closed atmosphere such as in a chamber, or in an open atmosphere. The use of laser as the high energy beam allows the irradiation step to be performed in an air atmosphere under ordinary temperature and pressure as an open atmosphere. Note, however, that the irradiation step may preferably be performed while flowing a specified gas to the surface part under treatment in order to avoid impurities or the like from being involved. For example, nitrogen gas or other appropriate gas may be flowed to the surface part under treatment from above or the side thereof. By adjusting the direction of flowing gas, the suppression of debris caused by ablation and other desired effects may be obtained. For example, the flowing direction may be set coaxially with the optical axis of the high energy beam thereby to improve the controllability of the atmosphere and the homogeneity of the hard part.

«Use Application»

The use application of the sliding member according to the present invention is not limited and may be applied to a member that requires wear resistance. For example, the sliding member according to the present invention is preferably used for or as various types of sliding members for cars (such as engine components and drive-line components), various mechanical components, pump components, metallic molds, tools, etc.

EXAMPLES

«Production of Samples»
(1) Metal Base Material

As metal base materials, a steel base material comprised of common carbon steel (JIS S45C) and a titanium alloy base material comprised of commercially available typical alpha-beta-type titanium alloy (Ti-6 mass % Al-4 mass % V) were prepared. Each base material size was appropriately changed in accordance with the use of the material under test.

(2) High Energy Beam

As the high energy beam, pulse laser having a wavelength within near-ultraviolet region (190 to 400 nm, in particular 320 to 400 nm) and a pulse width of nanoseconds level was prepared (this laser will be referred simply to as "near-ultraviolet nano" laser).

(3) Irradiation Step

The near-ultraviolet nano laser was irradiated to the surface part to be treated of each base material while being caused to move along a predetermined trace. This irradiation was performed while flowing various gases (total flow rate: 5 L/min) from above along the optical axis of the near-ultraviolet nano laser in an air atmosphere of ordinary temperature. Unless otherwise stated, the trace of the near-ultraviolet nano laser was set as being parallel straight lines having a predetermined space (pitch) and a stripe-like surface texture (refer to FIG. 1A or FIG. 1B) was formed on or near the surface of each base material.

Specific characteristics of laser (wavelength, pulse width, oscillation frequency, output, and output density (laser fluence)), relative movement speed of laser to the surface part under treatment (scanning speed), and focal position (focal point shift distance: 0 micrometers) are collectively listed in Table 1. In addition, the pulse lap ratio of the near-ultraviolet nano laser was set to be 85%.

«Basic Tests»

Along the above method, samples were produced while changing various ambient gases as shown in Table 2. Using each sample, the characteristics of parts irradiated with the near-ultraviolet nano laser (modified parts or hard parts) were measured and analyzed as below.

(1) Formation of Modified Parts

Figure 4:
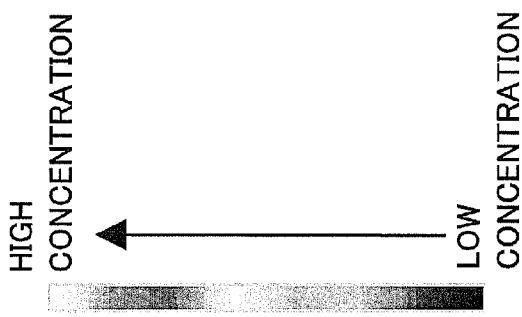
FIG. 4 depicts photographs representing appearances by EPMA analysis of cross-sections of treated surface parts obtained by irradiating laser to steel base materials in various ambient gases.

FIG. 4 represents appearances when cross-sections of Samples A11 to A14 were observed using Electron Probe Micro-Analysis (EPMA). FIG. 4 shows that the concentration (composition) of each element included in the modified parts having been formed is different depending on the ambient gas composition during the irradiation of the near-ultraviolet nano laser. Focusing attention on N, for example, as the nitrogen gas concentration (vol %) in the ambient gas increases, the N concentration in the modified parts also increases. Note, however, that as apparent from the back-scattered electron images (BEIs), all the samples can be understood such that homogeneous modified parts having a width of about 5 micrometers are formed from surfaces to a depth of about 80 micrometers.

(2) Hardness

Figure 5A:
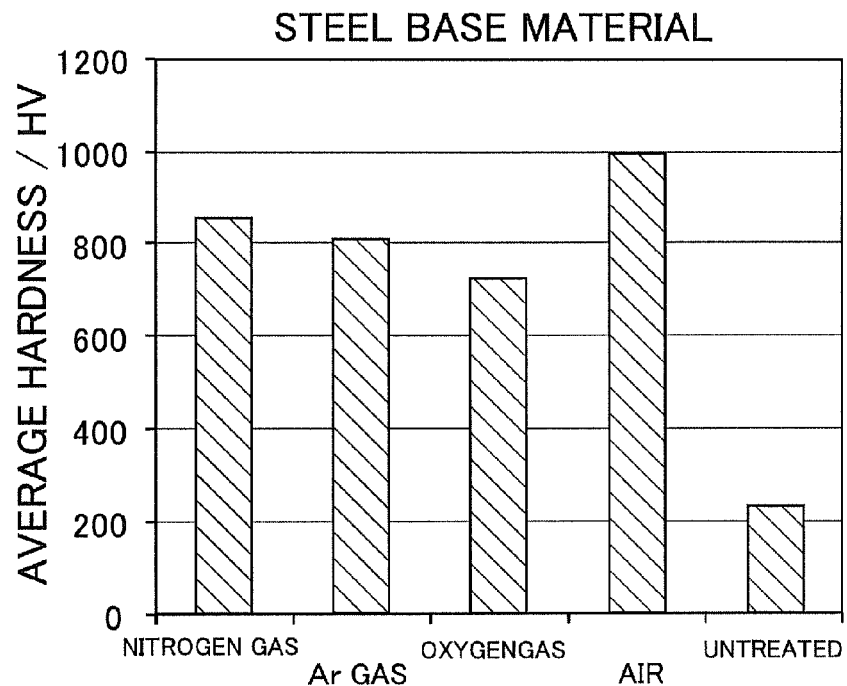
FIG. 5A is a bar graph illustrating average hardnesses of treated surface parts (modified parts) obtained by irradiating laser to steel base materials in various ambient gases.
Figure 5B:
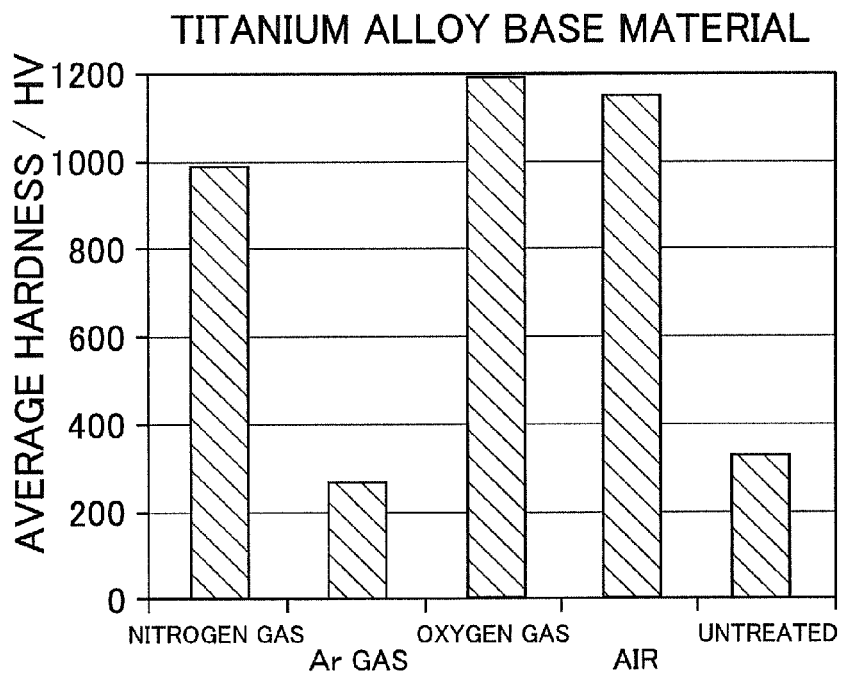
FIG. 5B is a bar graph illustrating average hardnesses of treated surface parts (modified parts) obtained by irradiating laser to titanium alloy base materials in various ambient gases.

Average hardness (surface hardness) of the modified parts of each sample was obtained. These results are shown in Table 2 and FIG. 5A and FIG. 5B (both figures will be collectively referred to as "FIG. 5"). This average hardness is obtained by arithmetically averaging Vickers hardness (micro Vickers hardness) of each modified part in the vicinity of the outermost surface, as previously described. Note that the hardness of the above steel base material (untreated/S45C) as one example is 210 HV, and the hardness of the above titanium alloy base material (untreated/Ti-6 mass % Al-4 mass % V alloy) is 330 HV.

In the case of the steel base material, it has been found that the modified parts have sufficient average hardness regardless of the ambient gas composition. For example, the modified parts formed in nitrogen gas as in Sample A11 had sufficiently large average hardness. It appears that this is because nitride was formed in the modified parts. Note that the formation of nitride was confirmed by X-ray diffraction.

Further, the modified parts formed in air as in Sample A16 had significantly large average hardness. It appears that this is because the steel base material was oxidized and nitrided to form the modified parts including oxide and nitride.

On the other hand, it has been found that the modified parts formed in Ar gas that does not include O and N as in Sample A14 also have sufficiently large average hardnesses. It appears that this is because the modified parts of Sample A14 experienced a phase transformation from ferrite structure (alpha-phase) to fine martensite phase.

Also in the case of titanium alloy base material, the modified parts having sufficiently large average hardnesses were formed except for the case of using Ar gas as the ambient gas. It has been thus confirmed that the modified parts or hard parts having sufficiently larger hardness than that of the metal base material in itself are formed. Note that a portion of the metal base material other than the modified parts or hard parts represents the non-modified part or tough part referred to in the present invention.

(3) N Concentration or O Concentration

From the quantitative analysis results obtained by analyzing the modified parts of each sample using EPMA, the concentration distribution of N or O contained in the modified parts was measured. One example thereof is each shown in FIG. 6A and FIG. 6B (both figures will be collectively referred to as "FIG. 6").

In addition, the average concentration obtained by arithmetically averaging the N concentration or the O concentration at positions of 15, 20, and 35 micrometers depths from the outermost surface of the modified part of each sample is also listed in Table 2.

Figure 6A:
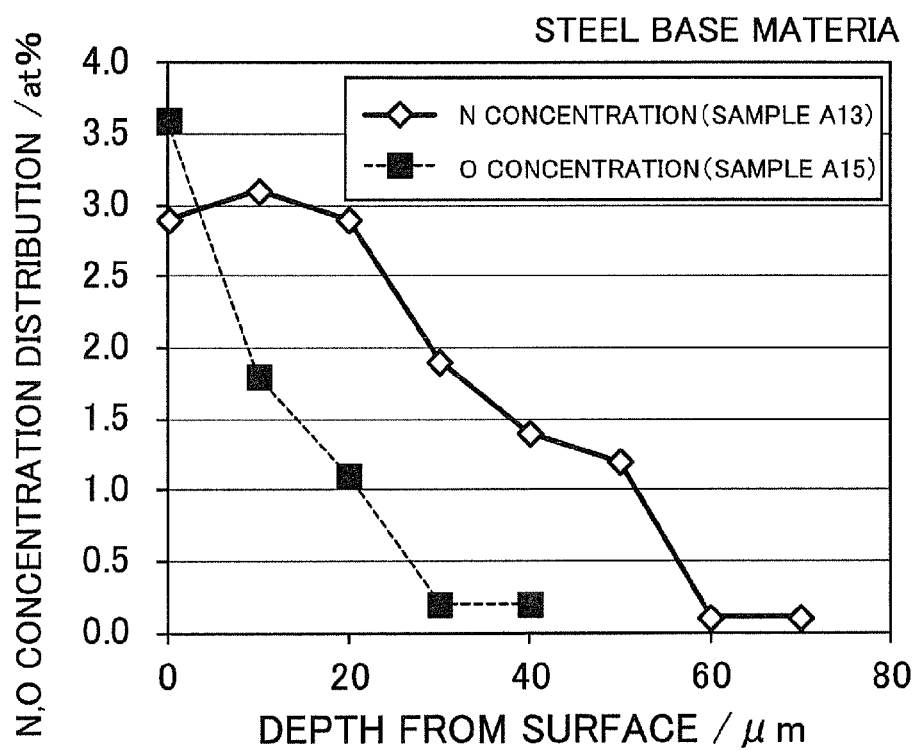
FIG. 6A is a graph illustrating the N concentration distribution or the O concentration distribution of treated surface parts (modified parts) obtained by irradiating laser to steel base materials in various ambient gases.

As understood from FIG. 6A, the steel base material shows that both the N concentration and the O concentration tend to decrease from the surface toward the depth direction. It can also be understood that N is included at least around or above a depth of 60 micrometers while O is included at least around or above a depth of 30 micrometers.

Figure 6B:
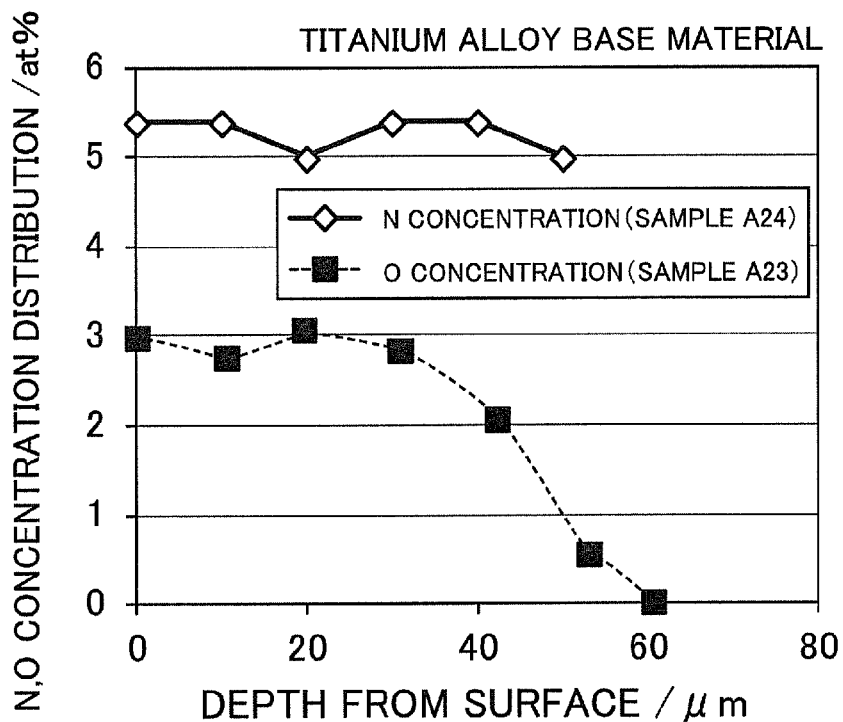
FIG. 6B is a graph illustrating the N concentration distribution or the O concentration distribution of treated surface parts (modified parts) obtained by irradiating laser to titanium alloy base materials in various ambient gases.

On the other hand, as understood from FIG. 6B, the titanium alloy base material shows that the N concentration takes a substantially uniform distribution to at least around or above a depth of 50 micrometers. It can also be understood that the O concentration takes a substantially uniform distribution to at least around or above a depth of 10 micrometers. By appropriately selecting conditions, the O concentration and the N concentration can be distributed to the inner part regardless of the gas type.

(4) Structure

Cross-sections of the modified parts of each sample were observed using Transmission Electron Microscope (TEM), and the average crystal grain diameter of crystal grains constituting the structure of the modified parts was obtained. These results are also listed in Table 2. Note that each average crystal grain diameter is a value obtained by arithmetically averaging the long axis and the short axis of each crystal grain appearing in the view of TEM image, as previously described.

It has been found that the average crystal grain diameter of each sample is about 300 nm and each modified part is comprised of extremely fine structure.

« Sliding Test»

(1) Production of Samples

First, using nitrogen gas as the ambient gas and according to the above method, block-like sample pieces (sliding members) were produced which each had a surface texture, on the sliding surface thereof, comprising modified parts with different extending direction and different pitch. The extending direction of the modified parts was either the perpendicular direction or the parallel direction to the sliding direction. The pitch of the modified parts is a space between predetermined straight traces to which near-ultraviolet nano laser is irradiated. Each surface area ratio shown in Table 3 is a fraction of the total surface area of the modified parts to the entire surface area of the surface texture. More specifically, after observing the sliding surface by an optical microscope and determining parts changed in color to be the hard parts, binarizing process using image analysis was performed to obtain the surface area ratio of the hard parts. The shape of the hard parts, such as width, may vary in accordance with the laser spot diameter, irradiation condition, and material. Therefore, the surface texture can be obtained by observing the shape under the irradiation and other conditions and continuously performing modification process. By using the shape obtained under these conditions and performing geometrical calculation, a surface texture having a high matching ability can be obtained.

Subsequently, as shown in Table 4, while changing various ambient gases, test pieces (sliding members) were produced each having a surface texture comprised of modified parts, with a pitch of 20 micrometers (surface area ratio: 46%), extending in the perpendicular direction to the sliding direction.

Note that, in the case of the steel base material, the N concentration in the modified parts when using nitrogen gas as the ambient gas was 6 at %, and the O concentration in the modified parts when using oxygen gas as the ambient gas was 3 at %. In the case of the titanium alloy base material, the N concentration in the modified parts when using nitrogen gas as the ambient gas was 5 at %, and the O concentration in the modified parts when using oxygen gas as the ambient gas was 3 at %. Both the N concentration and the O concentration when using argon gas as the ambient gas were 0 at %.

(2) Evaluation of Wear Resistance

Each test piece (15.7 mm×6.5 mm×10 mm) for each sample was subjected to block-on-ring test. The block-on-ring test refers to a test method in which the sliding surface (15.7 mm×6.5 mm) of each test piece is pressed to the cylinder-like outer circumferential surface of a rotating ring (diameter 35 mm×width 6.3 mm, material: SAE 4620 steel material) to evaluate the degree of wear of the test piece (refer to ASTM standard G77-05). More specifically, the test was performed using non-Mo engine oil as a lubricant under the conditions of the oil temperature: 80 degrees C., sliding speed: 0.3 m (rotating speed of ring: 164 rpm), pressing load: 44 N (Hertz surface pressure for test piece comprising steel base material: 120 MPa, Hertz surface pressure for test piece comprising titanium alloy base material: 80 MPa), and test period of time: 30 minutes. After this test, the wear depth of the sliding surface of each test piece was measured.

Figure 7A:
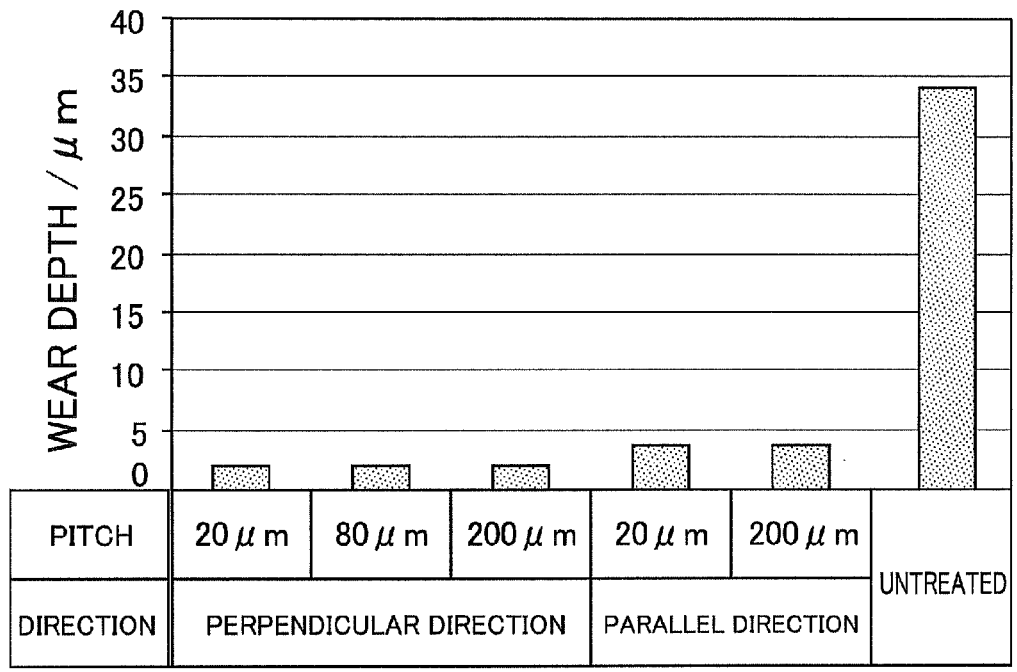
FIG. 7A is a bar graph illustrating wear depths of various sliding surfaces obtained by irradiating laser to steel base materials in nitrogen gas.
Figure 7B:
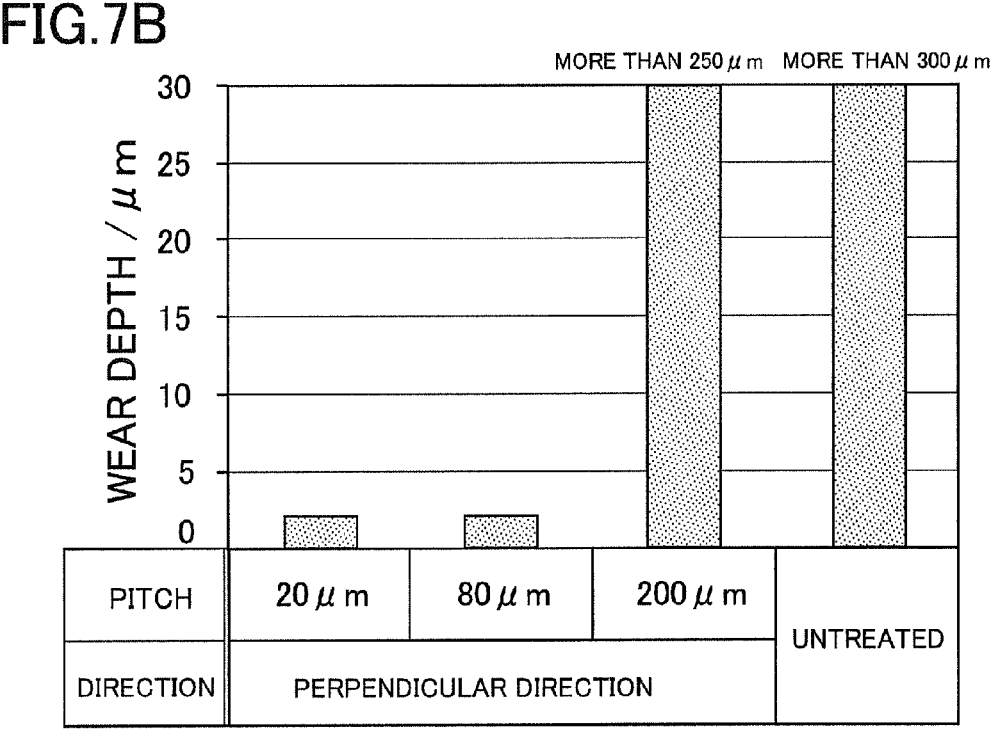
FIG. 7B is a bar graph illustrating wear depths of various sliding surfaces obtained by irradiating laser to titanium alloy base materials in nitrogen gas.
Figure 8A:
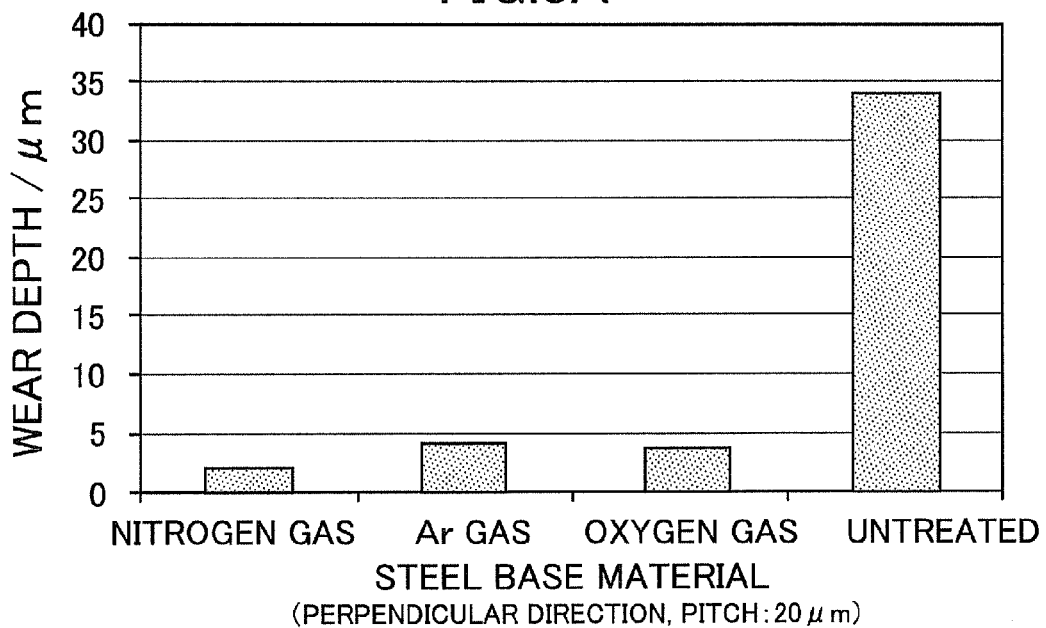
FIG. 8A is a bar graph illustrating wear depths of sliding surfaces obtained by irradiating laser to steel base materials in respective ambient gases.
Figure 8B:
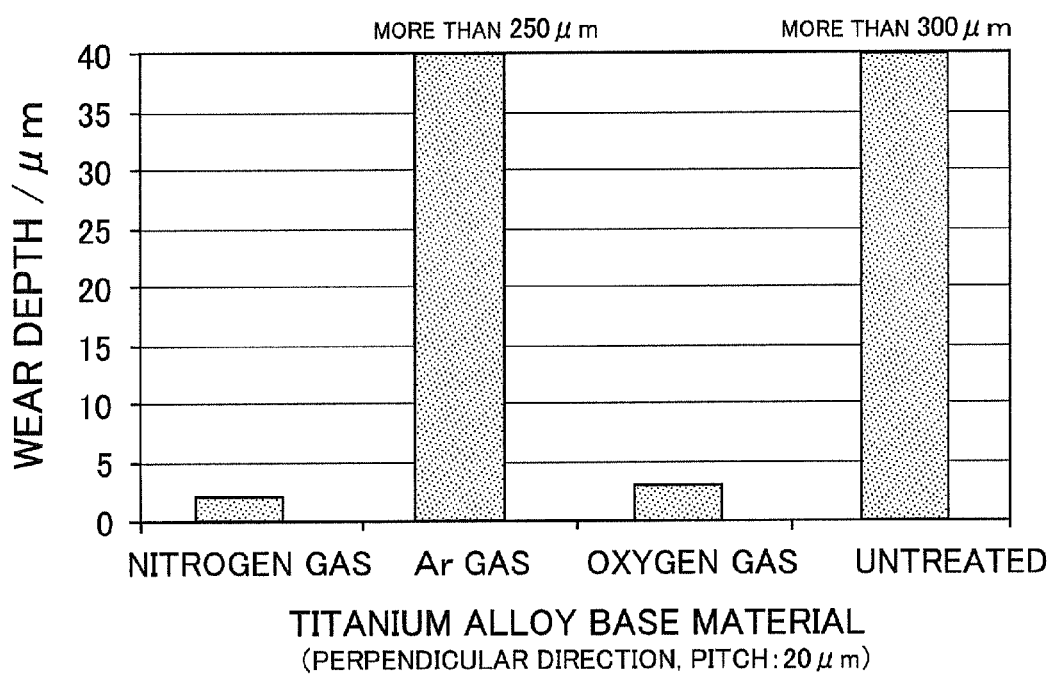
FIG. 8B is a bar graph illustrating wear depths of sliding surfaces obtained by irradiating laser to titanium alloy materials in respective ambient gases.

The wear depth of each test piece produced using nitrogen gas as the ambient gas is shown in Table 3, FIG. 7A and FIG. 7B (both figures will be collectively referred to as "FIG. 7"). In addition, the wear depth of each test piece produced in various ambient gases is shown in Table 4, FIG. 8A and FIG. 8B (both figures will be collectively referred to as "FIG. 8"). Note that the wear depth of the test piece comprising untreated steel base material was 34 micrometers, and the wear depth of the test piece comprising untreated titanium alloy base material was 310 micrometers.

(3) Evaluation

First, it has been found that every test piece comprising the steel base material has a small wear depth regardless of the extending direction and the pitch of the modified parts, the type of ambient gas, etc, and excellent wear resistance is exhibited. Among them, the wear depth of the test piece was relatively small when the extending direction of the modified parts was perpendicular to the sliding direction, the pitch of the modified parts was not unduly large, and the ambient gas was nitrogen gas.

Then, it has also been found that almost every test piece comprising the titanium alloy base material has a small wear depth and excellent wear resistance is exhibited. However, it has further been found that, different from the case of the steel base material, the unduly large pitch of the modified parts increases the wear depth thereby to deteriorate the wear resistance. It appears that such a difference is due to the expansion of the Hertz contact surface area because the rigidity (longitudinal elastic modulus) of the titanium alloy base material to the load applied during the above block-on-ring test is relatively smaller than that of the steel base material.

Conversely, if the matching among the surface pressure at the time of sliding (the above pressing load), the rigidity of the base material and the pitch is achieved, then excellent wear resistance can be stably obtained. The surface area ratio of the modified parts (hard parts) can be used as an index in this case, and it is preferred to ensure an appropriate surface area ratio in accordance with the surface pressure at the time of sliding and the type of the metal base material. For example, in the case of sliding under a high surface pressure as the above, it is preferred that the surface area ratio for a high-rigidity steel base material is 2% or more or 5% or more, while the surface area ratio for a relatively low-rigidity titanium alloy base material is 10% or more or 12% or more.

On the other hand, in the case of the test piece (Sample C22) comprising titanium alloy base material treated in Ar gas as the ambient gas, the wear depth was large and the wear resistance was not able to be significantly improved. It appears that this is because, different from the test piece comprising the steel base material, hardening due to phase transformation was not caused in the test piece comprising the titanium alloy base material. Note, however, that even in this case the improvement of the wear resistance can be observed because the wear depth is reduced compared with the untreated case. It appears that this is because the metallographic structure of the modified parts was refined in size due to the above irradiation step.

Moreover, from the comparison of FIG. 5 and FIG. 8, it is apparent that the wear depth of the sliding surface is correlated with the average hardness of the modified parts. Therefore, it may be found that, by providing the sliding surface with the surface texture in which the modified parts having larger hardness than that of the metal base material in itself are located, a sliding member can be obtained which stably exhibits excellent wear resistance.

«Consideration»

Considering the above, the present invention may be perceived not only as the sliding member having a surface texture on the sliding surface thereof but also as an expanded aspect of the sliding member, i.e. a sliding member having a hard part of fine structure on the sliding surface. For example, the present invention may be perceived as a sliding member characterized in that a sliding surface formed on the surface of a metal base material has a hard part having an average crystal grain diameter of 10 micrometers or less. This average crystal grain diameter may be 10 micrometers or less, 5 micrometers or less, 1 micrometer or less, 700 nm or less, 500 nm or less, or 400 nm or less, as previously described.

In addition, as previously described, the hard part may be provided as a modified part obtained by an irradiation step that irradiates a high energy beam to a surface part to be treated of the metal base material while relatively moving the high energy beam thereby to cause ablation in the surface part and to generate plasma in the vicinity of the surface part. This high energy beam is preferably pulse laser having a wavelength of 700 nm or less, for example. In addition, the irradiation step is preferably a step that irradiates the pulse laser to the surface part while partially overlapping irradiated regions by pulse light beams adjacently oscillating. Moreover, the irradiation step is preferably such that a pulse lap ratio is 10% to 90% wherein the pulse lap ratio is a fraction that irradiated regions of the pulse light beams are overlapped. Note that also in these cases the metal base material of the sliding member may comprise any of iron alloy, titanium alloy, aluminum alloy, magnesium alloy, or copper alloy.

TABLE 1

| Wavelength (nm) | Pulse width (ns) | Oscillation frequency (kHz) | Output (W) | Output density (MW/cm$^2$) | Scan speed (mm/s) | Focal position |
|---|---|---|---|---|---|---|
| 355 | <20 | 20 | 1.2 | 300 | 2 | 0 (on the outermost surface of the surface part to be treated) |

TABLE 2

| Sample No. | Melat base material | Ambient gas in irradiation step | Average hardness (Hv) | Average concentration (at %) N | Average concentration (at %) O | Average crystal grain diameter (nm) |
|---|---|---|---|---|---|---|
| A11 | Steel (S45C) | N$_2$ | 855 | 4.2 | — | — |
| A12 | | N$_2$: 80% Ar: 20% | — | 5.1 | — | — |
| A13 | | N2: 40% Ar: 60% | — | 2.8 | — | — |
| A14 | | Ar | 809 | — | — | — |
| A15 | | O$_2$ | 723 | — | 1.7 | — |
| A16 | | Air (N$_2$ + O$_2$) | 996 | 3.4 | 1.4 | 150 |
| A21 | Titanium alloy | N$_2$ | 989 | 5.8 | — | — |
| A22 | (Ti—6% Al—4% V) | Ar | 272 | — | — | — |
| A23 | | O$_2$ | 1196 | — | 2.9 | 300 |
| A24 | | Air (N$_2$ + O$_2$) | 1159 | 5.3 | 1.2 | 291 |

TABLE 3

| Sample No. | Metal base material | Modified parts Extending direction to sliding direction | Pitch (μm) | Surface area ratio (%) | Wear depth (μm) |
|---|---|---|---|---|---|
| B11 | Steel (S45C) | Perpendicular | 20 | 46 | 2 |
| B12 | | | 80 | 14 | 2 |
| B13 | | | 200 | 8 | 3 |
| B14 | | Parallel | 20 | 46 | 3.5 |
| B15 | | | 200 | 8 | 3.5 |
| B21 | Titanium alloy | Perpendicular | 20 | 46 | 2 |
| B22 | (Ti—6% Al—4% V) | | 80 | 14 | 2 |
| B23 | | | 200 | 8 | 260 |

Note)
Ambient gas in irradiation step: N$_2$ gas

TABLE 4

| Sample No. | Metal base material | Ambient gas in irradiation step | Wear depth (μm) | Remarks |
|---|---|---|---|---|
| C11 | Steel (S45C) | N₂ | 2 | Same as Sample B11 |
| C12 | | Ar | 4 | |
| C13 | | O₂ | 3.5 | |
| C21 | Titanium alloy (Ti—6% Al—4% V) | N₂ | 2 | Same as Sample B21 |
| C22 | | Ar | 260 | |
| C23 | | O₂ | 3 | |

Notes)
Extending direction to sliding direction of modified parts: perpendicular Pitch of modified parts: 20 μm (surface area ratio: 46%)

The invention claimed is:

1. A sliding member having a sliding surface formed on a surface of a metal base material, the sliding surface having a surface texture that comprises:
  a hard part, the hard part being a modified part obtained by subjecting the surface of the metal base material to modification treatment; and
  a tough part contacting with the hard part, the tough part being a non-modified part that is not subjected to the modification treatment, the tough part having a hardness lower than that of the hard part, and a portion of the hard part that extends below the sliding surface is surrounded on every side by the tough part, wherein
    the hard part is either one of: (i) a nitride part subjected to nitridation treatment; (ii) an oxide part subjected to oxidation treatment; (iii) a phase transformation part subjected to heat treatment; or (iv) a size refined part subjected to size refinement treatment for crystal grains;
    when the hard part is obtained by subjecting the surface of the metal base material to the nitridation treatment or the oxidation treatment, a concentration of nitrogen or oxygen in the hard part is 1 atomic percent (at%) or more;
    when the hard part is obtained by subjecting the surface of the metal base material to the size refinement treatment, an average crystal grain diameter of the hard part is 400 nm or less; and
    the tough part has the same original characteristics as the metal base material before the metal base material is subjected to any of the nitridation treatment, the oxidation treatment, the heat treatment, or the size refinement treatment, the original characteristics including at least a concentration of nitrogen, a concentration of oxygen, a phase, and the average crystal grain diameter.

2. The sliding member as set forth in claim 1, wherein the surface texture is configured such that the hard part and the tough part are present in a mixed fashion with micro-meso region level.

3. The sliding member as set forth in claim 1, wherein the surface texture is such that at least a part of the hard part is stripe-like, grid-like, or dot-like.

4. The sliding member as set forth in claim 1, wherein the surface texture is such that at least a part of the hard part extends lengthwise in a direction that is not parallel to a sliding direction.

5. The sliding member as set forth in claim 1, wherein the surface texture is such that surface area ratio (100×S1/S0) as a fraction of total surface area (S1) of the hard part to the entire surface area (S0) is 2% to 95%.

6. The sliding member as set forth in claim 1, wherein the metal base material comprises any of iron alloy, titanium alloy, aluminum alloy, magnesium alloy, or copper alloy.

7. A sliding member having a sliding surface formed on a surface of a metal base material, the sliding surface having a surface texture that comprises:
  a hard part, the hard part being a modified part that is formed by a process of irradiating a high energy beam on a surface part to be treated of the metal base material, while relatively moving the high energy beam, thereby to cause ablation in the surface part and to generate plasma in a vicinity of the surface part, such that the surface part irradiated by the high energy beam forms the hard part; and
  a tough part contacting with the hard part, the tough part being a non-modified part that is not subjected to irradiation, the tough part having a hardness lower than that of the hard part, and a portion of the hard part that extends below the sliding surface is surrounded on every side by the tough part, wherein
    a concentration of nitrogen or oxygen in the hard part is 1 atomic percent (at%) or more;
    an average crystal grain diameter of the hard part is 400 nm or less; and
    the tough part has the same original characteristics as the metal base material before the metal base material is subjected to the irradiation, the original characteristics including at least a concentration of nitrogen, a concentration of oxygen, a phase, and the average crystal grain diameter.

8. A production method for a sliding member, the production method comprising an irradiation step of irradiating a high energy beam on a surface part to be treated of the metal base material, while relatively moving the high energy beam, thereby to cause ablation in the surface part and to generate plasma in a vicinity of the surface part, wherein
  the sliding member as set forth in claim 1 is obtained to have the surface part as the hard part.

9. The production method for a sliding member as set forth in claim 8, wherein the high energy beam is a pulse laser having a wavelength of 700 nm or less.

10. The production method for a sliding member as set forth in claim 8, wherein the irradiation step is a step that irradiates the pulse laser to the surface part while partially overlapping irradiated regions by pulse light beams adjacently oscillating.

11. The production method for a sliding member as set forth in claim 8, wherein the irradiation step is such that a pulse lap ratio is 10% to 90%, the pulse lap ratio being a fraction that irradiated regions by the pulse light beams are overlapped.

* * * * *